United States Patent [19]

Blair

[11] 4,060,054
[45] Nov. 29, 1977

[54] SYSTEM FOR HOG PRODUCTION IN A CONTROLLED ENVIRONMENT

[76] Inventor: Bruce A. Blair, 2400 Lakeview, Apt. 410, Chicago, Ill. 60614

[21] Appl. No.: 588,330

[22] Filed: June 19, 1975

[51] Int. Cl.$^2$ ............................................. A01K 1/00
[52] U.S. Cl. ...................................... 119/16; 119/28
[58] Field of Search ...................... 119/15, 16, 20, 27, 119/28, 81, 18, 52 AF, 53, 57, ; 210/175; 52/586, 588, 669, 2; 426/521, 807

[56] References Cited

U.S. PATENT DOCUMENTS

| | | | |
|---|---|---|---|
| 3,098,465 | 7/1963 | Ivey | 119/15 |
| 3,112,762 | 12/1963 | Reitman | 119/81 |
| 3,148,662 | 9/1964 | Morrell | 119/16 |
| 3,197,934 | 8/1965 | Brown | 403/353 |
| 3,229,663 | 1/1966 | Conover | 119/16 |
| 3,230,931 | 1/1966 | Taylor et al. | 119/28 |
| 3,261,324 | 7/1966 | Conover | 119/16 |
| 3,283,744 | 11/1966 | Conover | 119/16 |
| 3,412,514 | 11/1968 | Giovannucci | 52/588 |
| 3,601,096 | 8/1971 | Rutherford | 119/15 |
| 3,633,547 | 1/1972 | Stevens et al. | 119/28 |
| 3,685,493 | 8/1972 | Weiland, Jr. | 119/28 |
| 3,726,254 | 4/1973 | Conover | 119/16 |
| 3,789,800 | 2/1974 | Steudler, Jr. | 119/81 |
| 3,802,390 | 4/1974 | Blair et al. | 119/16 |

FOREIGN PATENT DOCUMENTS

| | | | |
|---|---|---|---|
| 1,352,991 | 1974 | United Kingdom | 119/15 |

*Primary Examiner*—Louis G. Mancene
*Assistant Examiner*—Peter K. Skiff

*Attorney, Agent, or Firm*—Hill, Gross, Simpson, Van Santen, Steadman, Chiara & Simpson

[57] ABSTRACT

A large capacity system for hog production in a controlled environment provides, within an inflated air dome housing, a base from the central area of which rises a multi-tier hog finishing structure. At generally base level a relatively wide area about the tiered structure includes a first or breeding and farrowing zone adjacent the inside perimeter of the housing dome and a second or nursery feeder pen zone between the first zone and a third zone under the tiered structure. The third zone provides an initial growing and observation area to receive pigs from the nursery feeder pen zone and from which the pigs are transferred at the proper intervals to the tier levels for finishing to market weight. This new animal movement program corresponds directly to advantageous proportionate management activity and observation requirements and maximizes these activities at the most pleasing area of the structure. Waste disposal is effected substantially without need for flushing cleaning, and the waste is reprocessed and pasturized and recycled into the feed supply, being delivered to the animals by a continuously operating automatic and low maintenance feed system. Innovations in the air dome comprise shielding against solar radiation during times of hot outside temperatures and insulating against cold outside temperatures through the use of reflective plastic membrane, a transparent area is provided in the dome housing peripherally adjacent the first zone and a substantial translucent area is provided at the back of the dome for daylight illumination of the interior. A new peripheral air circulation system efficiently utilizes the slatted deck structure for the pens.

34 Claims, 20 Drawing Figures

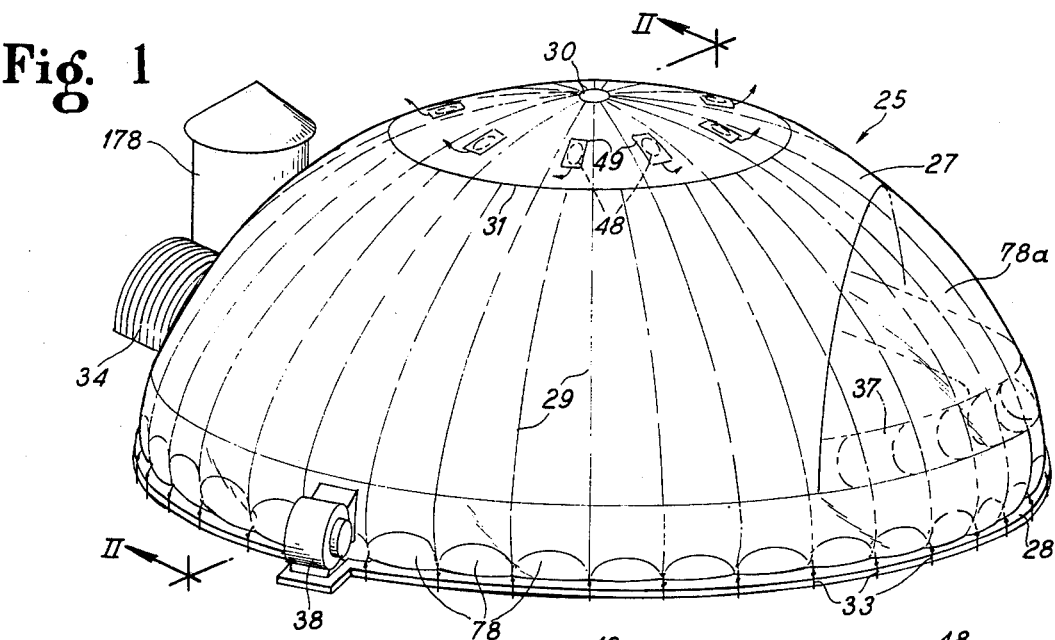
Fig. 1
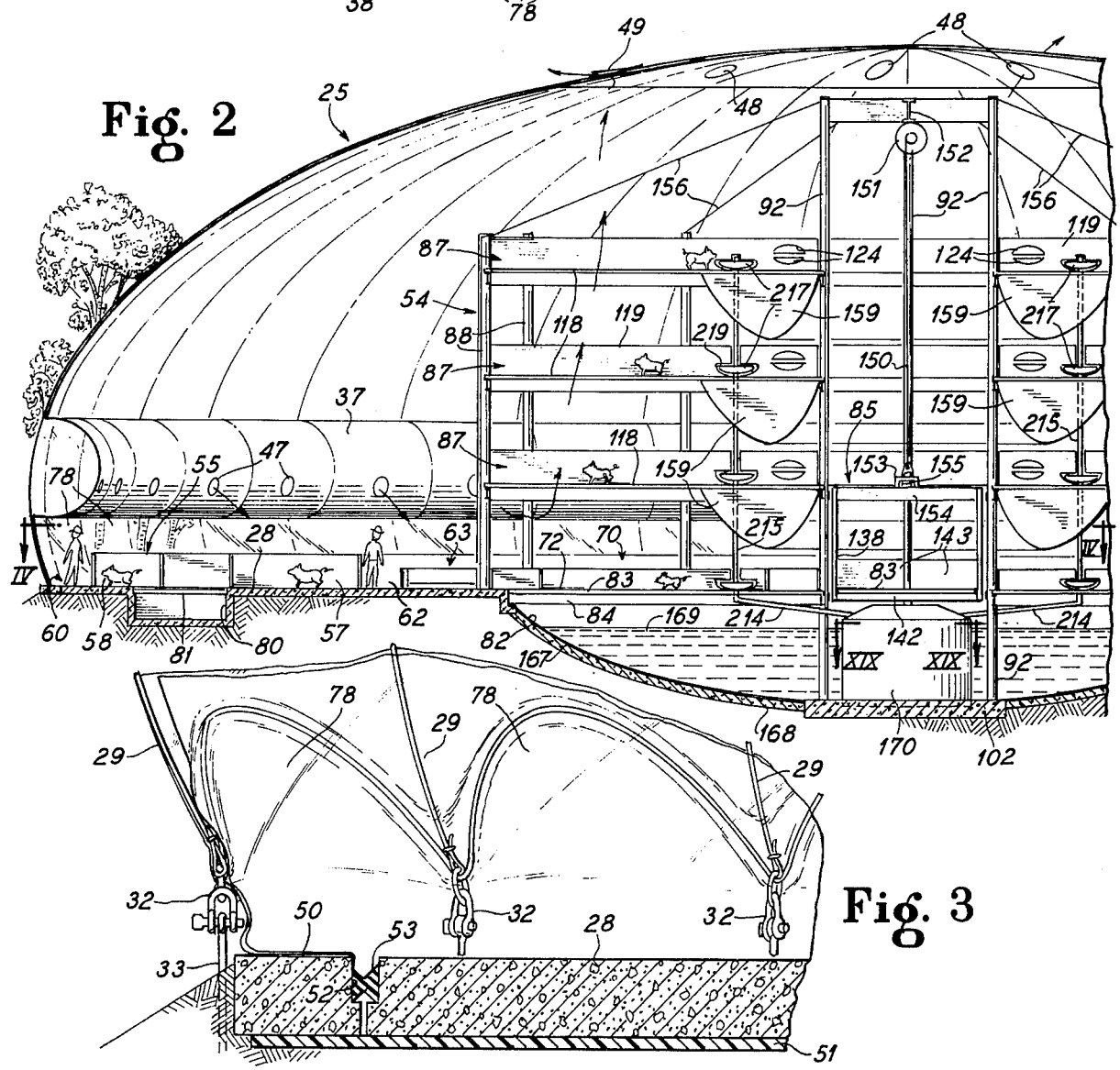
Fig. 2
Fig. 3

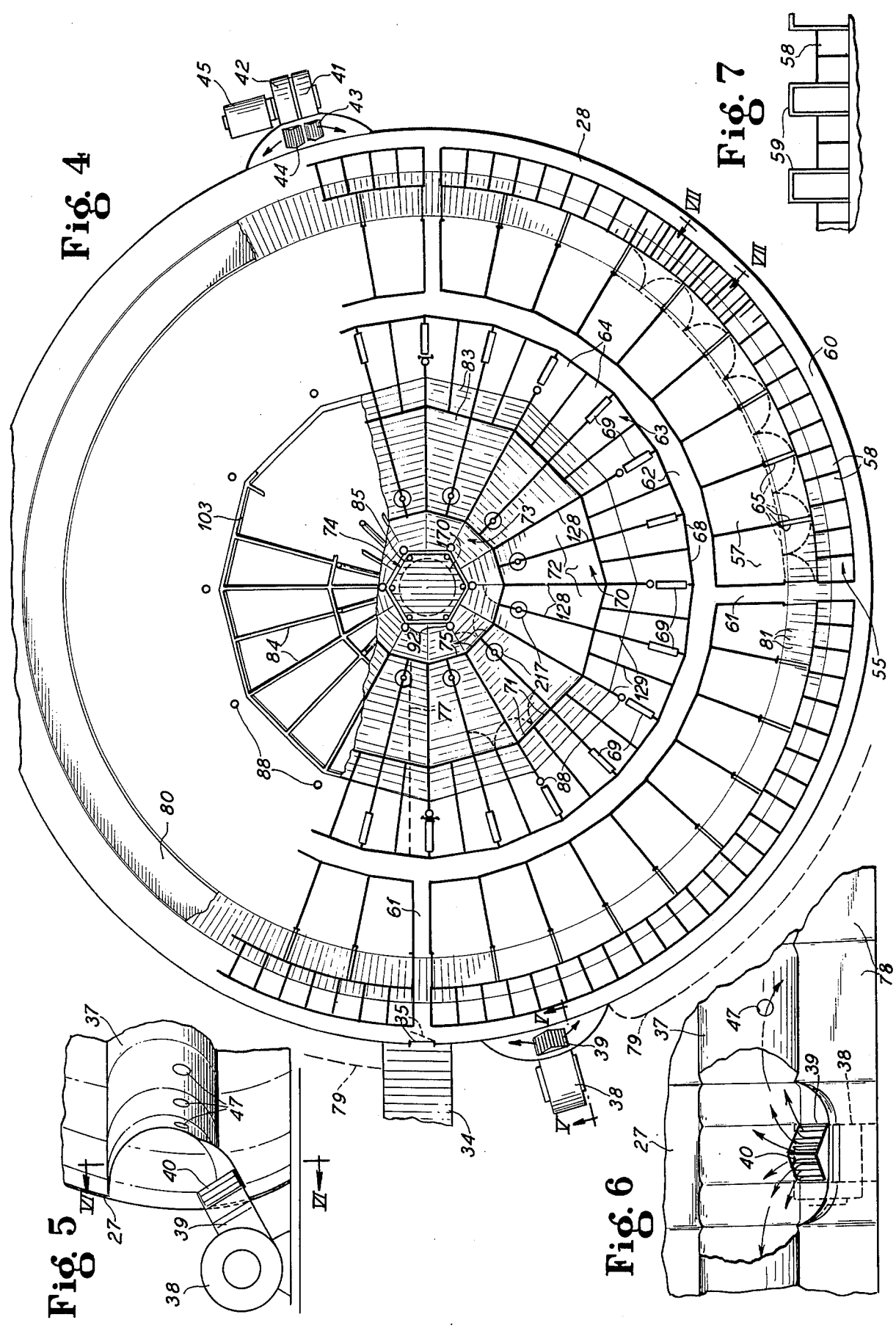

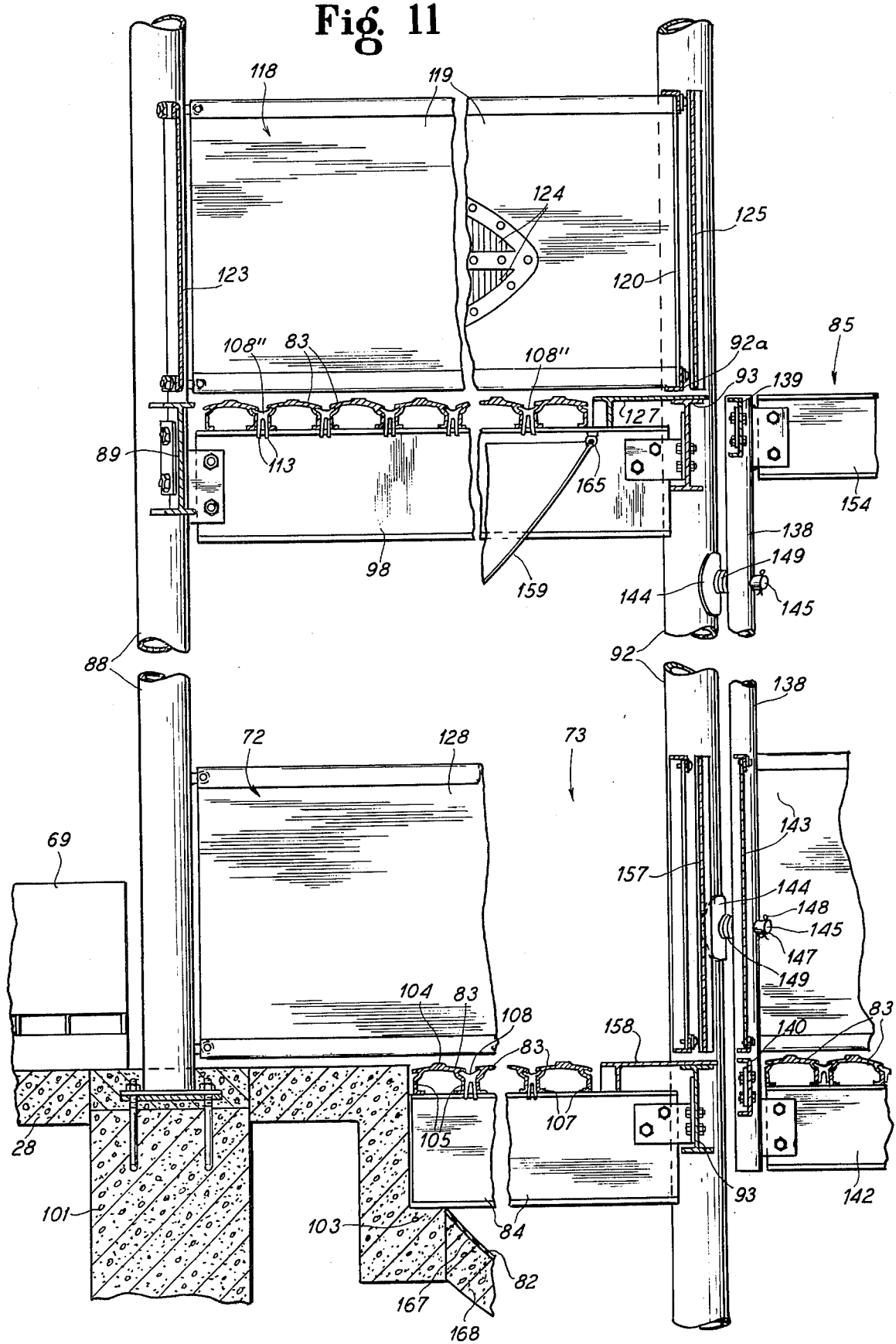

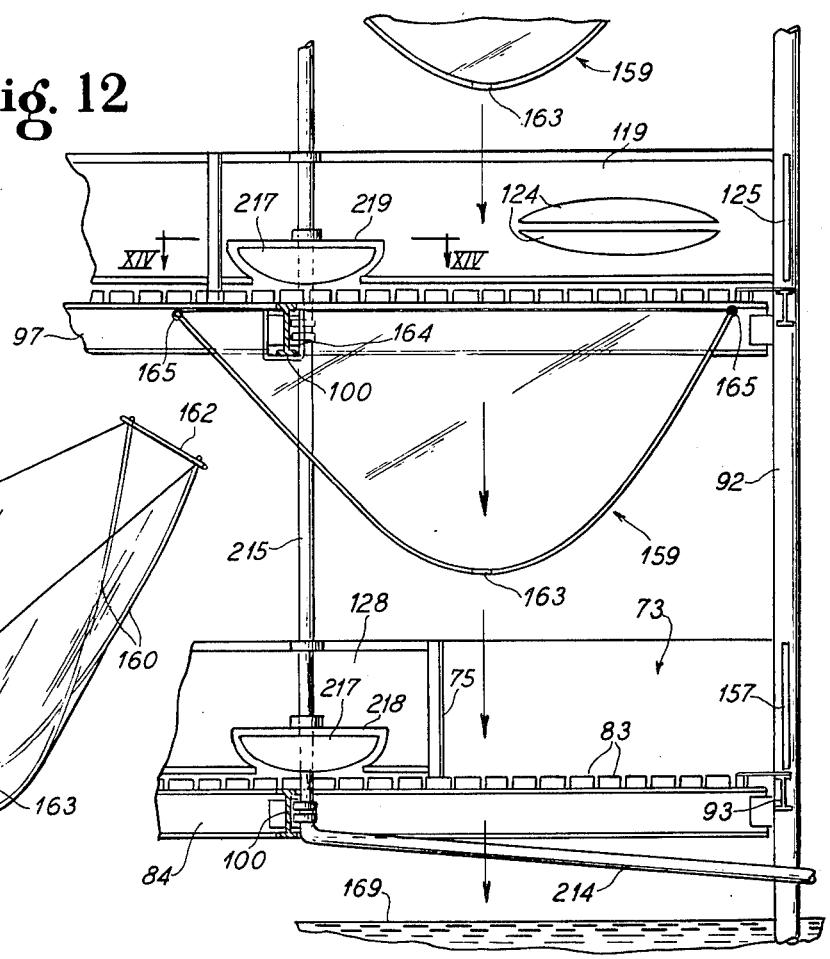
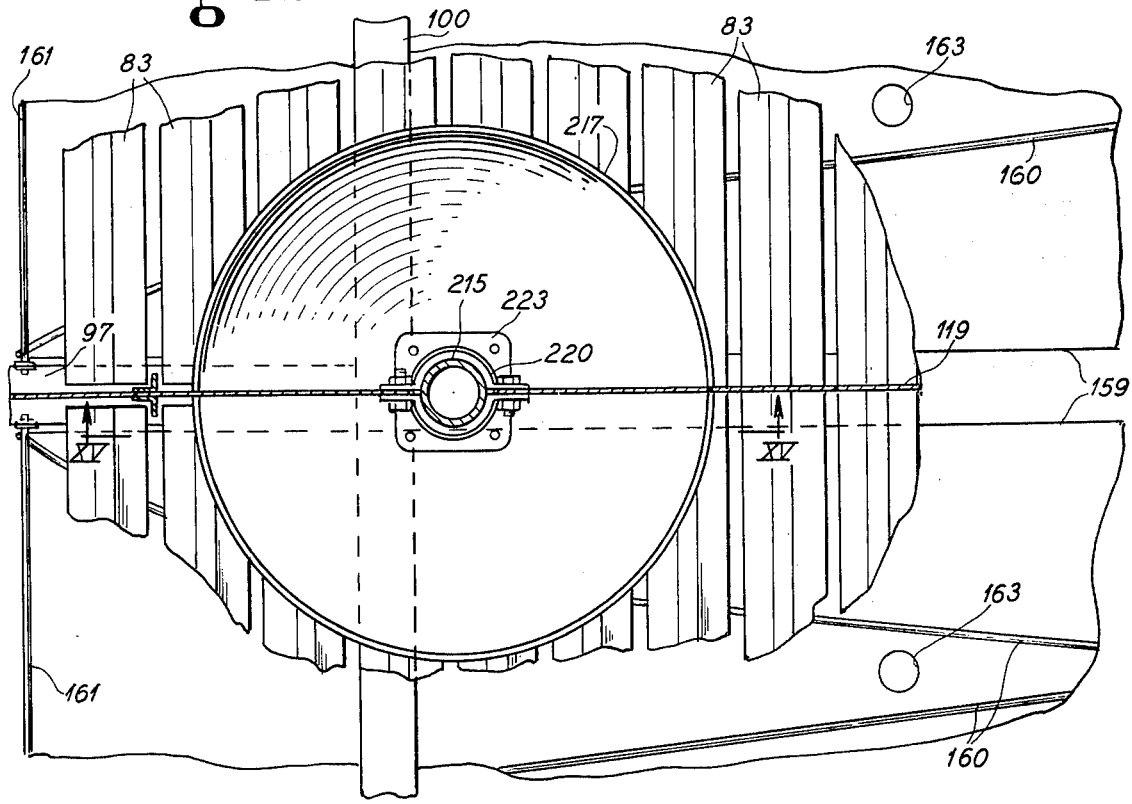

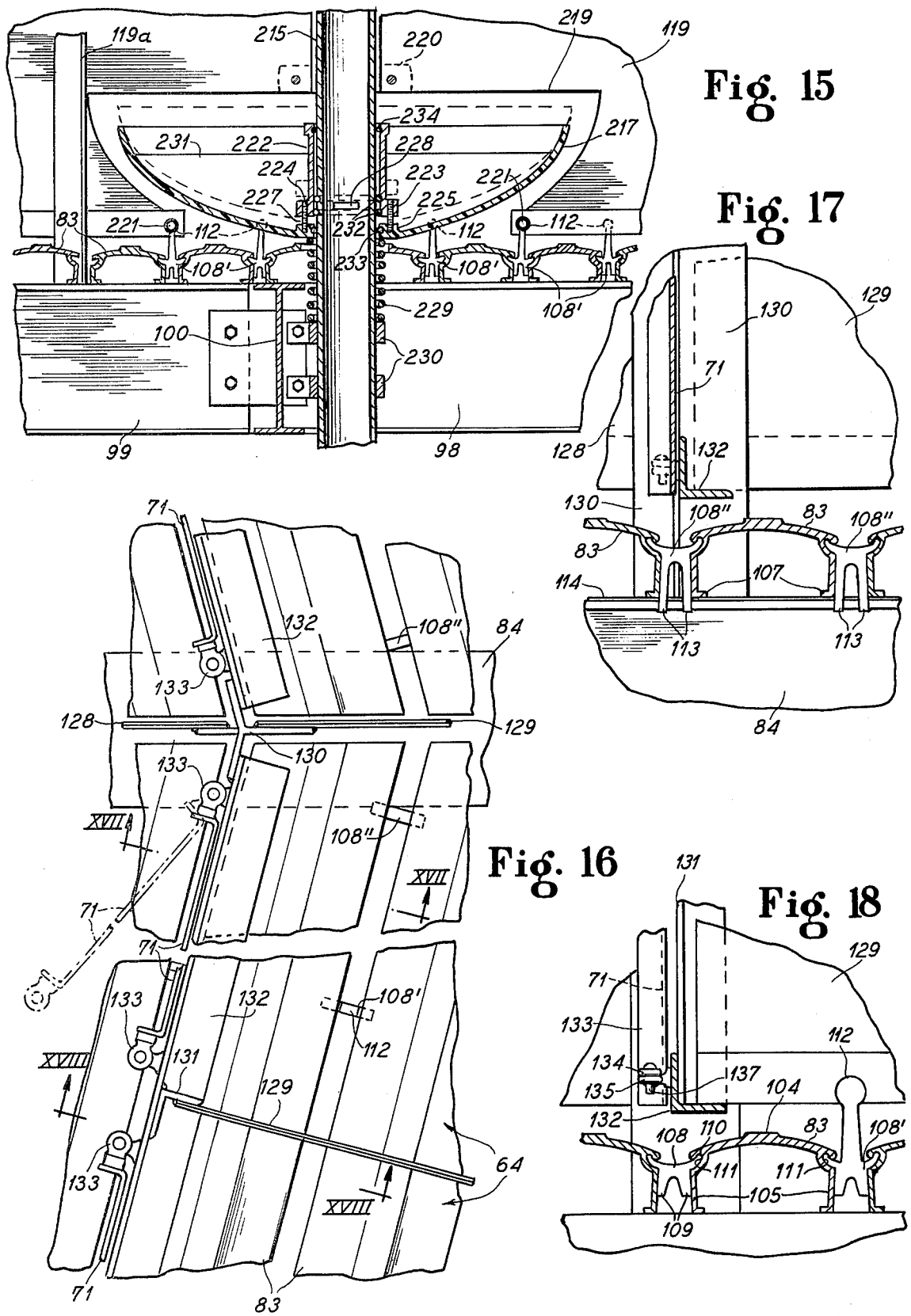

SYSTEM FOR HOG PRODUCTION IN A CONTROLLED ENVIRONMENT

This invention relates to a new and improved system for hog production in a controlled environment wherein large numbers of hogs can be processed within the same enclosure from breeding to market weight in an economical, continuous, mass production manner.

There has been considerable development in the raising of hogs under one roof in multi-tiered structures to handle large numbers of the animals from breeding to market weight, minimizing movement of animals from farrowing to the time the animals reach market weight, conserving management time and minimizing duplication of equipment. Tiered arrangement of pens within the production system increases the yield for the occupied area, conserves heat during cold weather and permits improved cooling air circulation in warmer weather. Internal air pressure within the housing not only supports the flexible air dome but provides a pressure barrier against disease vectors such as insects, birds, and the like.

U.S. Pat. Nos. 3,633,547 and 3,802,390 disclose prior arrangements of the general type in respect to which the present invention provides a number of important improvements.

Attention is also directed to U.S. Pat. Nos. 3,846,558, and 3,846,559 disclosing methods for converting animal waste products into a food supplement, according to which hog excreta is processed for recycling and thereby conservation of the nutritional values. The present invention provides improvements in waste disposal and recycling as a food supplement.

Although the patents which have been thus identified have substantially advanced the art of feeding and maintaining animals in a confined environment, there are a number of disadvantages, deficiencies, inefficiencies, shortcomings and problems in the systems described in the first two patents, and in the utilization of the waste conversion methods of the second two patents noted, among which may be mentioned excessive investment requirements for equipping and installing the system, lack of efficiency and lower yield than desirable due to overcrowding, undue requirements for management attention, an inadequate waste disposal arrangement requiring frequent flushing and continuous maintenance, air distribution and circulation problems and poor feeding arrangements within the hog pens.

An important object of the present invention is to overcome the foregoing and other disadvantages, deficiencies, inefficiencies, shortcomings and problems in prior systems and methods concerned with mass production of hogs, and to provide a new and improved system for hog production in a controlled environment.

Another object of the invention is to provide new and improved breeding, farrowing and nursery or feeder pen accommodations in a controlled environment hog producing system.

A further object of the invention is to provide for improved waste disposal and recycling in such a system.

Yet another object of the present invention is to provide a new and improved air dome housing structure for such a system.

A still further object of the invention is to provide a new and improved feeding arrangement for such a system.

A yet further object of the invention is to provide various structural improvements in such a system for minimizing cost and improving efficiency.

According to features of the invention, there are provided means for hog production in a controlled environment and including a housing rising from and covering a base providing a first floor of substantial expanse, and a multi-tiered structure spaced substantially inwardly from the perimeter of the housing, and comprising a plurality of vertically spaced tier floors above the first floor and all of the tier floors being equipped with hog finishing pens large enough to accommodate a social group of growing hogs to finished market size, each finishing pen having a social floor area in one end portion in which the hogs penned therein for finish growing can congregate and rest, and each finishing pen having a slatted feeding and drop-through dunging floor area in an opposite end portion where hog feeding and dunging can take place without disturbing the hogs in the social area, there being automatic hog food supplying means in each feeding and dunging area; the social areas of the finishing pens of each tier floor being vertically aligned with the same areas in the finishing pens therebelow and the feeding and dunging areas of the finishing pens being vertically aligned with the same areas in the finishing pens therebelow; means under each of the slatted feeding and dunging areas for collecting dropped hog waste and funneling the waste to drop through such a small portion of the slatted feeding and dunging area therebelow that the hogs can readily avoid said small drop portion while using the feeding and dunging area; a substantial width area on the first floor between the housing perimeter and the multi-tier structure being divided into an annular array of farrowing pens for farrowing crates adjacent to the housing perimeter, and an annular array of breeding pens surrounded by the farrowing pens and having gates adjacent to the farrowing pens; an annular array of nursery pens surrounded by and separated from the breeding pens by an annular aisle and adapted for receiving small nursery size pigs from the farrowing pens; means enabling hand feeding of the nursery pigs from said aisle; an annular array of training pens surrounded by and having gates separating them from the nursery pens and in which training pens trainer pigs are received from the nursery pens after attaining a stage of development in which they can adjust to automatic feeding means; at least said training pens being under said tier floors in vertical alignment under said finishing pens and each training pen having a social area and a slatted feeding and drop-through dunging area both of which training pen areas are located in vertical alignment under the corresponding areas of the overhead finishing pens, and therebeing similar automatic hog food supplying means in the training pen feeding and dunging areas as in the overhead feeding and dunging areas, the waste collecting means of the finishing pens funneling and dropping the hog waste through the training pen feeding and dunging areas in the same manner as in the like areas of the finishing pens, whereby to accustom the trainer pigs to the conditions in the upper tier floor finishing pens before transfer of the pigs as growing hogs to said finishing pens; and means centrally located relative to the array of training pens by which the pigs are transferred to the hog finishing pens on said tier floors after a limited growth and training development time interval in said training pens.

Means are also provided for recycling the animal waste into the food supply and comprising a receiving basin under the pens and of ample capacity to accommodate all waste produced by a large number of animals for conversion into reusable animal feed for recycling into the food supply, and having means in the tank for effecting the conversion and mixing the converted waste material with fresh feed, the cooked mixture being delivered to the automatic hog food supply means for the finishing and training pens.

Novel housing means are also provided wherein an inflated plastic film dome on which at least the portions normally exposed to the sun are in the form of a highly reflective metalized opaque solar shield and heat retention means, the lower perimeter portion of the dome about the breeding and farrowing area being transparent to permit viewing of the outdoors by the brood sows.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure, and in which:

FIG. 1 is an exterior perspective view of a representative embodiment of the present invention providing a substantially self-contained system for hog production in a controlled environment;

FIG. 2 is an enlarged fragmentary vertical sectional elevational view taken substantially in the plane of line II—II of FIG. 1;

FIG. 3 is an enlarged fragmentary sectional detail view showing details of the base and of anchoring means for the air dome housing;

FIG. 4 is a top plan view of the base or ground floor layout for the system taken substantially in the plan of line IV—IV of FIG. 2;

FIG. 5 is an enlarged fragmentary vertical sectional detail view taken substantially along the line V—V of FIG. 4;

FIG. 6 is a fragmentary elevational view taken substantially in the plane of the line VI—VI of FIG. 5, and partly broken away for illustrative purposes;

FIG. 7 is a fragmentary elevational view taken substantially along the line VII—VII of FIG. 4;

FIG. 11 is an enlarged fragmentary sectional elevational view of the tier deck structure and part of the central elevator shaft showing details of the elevator;

FIG. 12 is an enlarged fragmentary sectional detail view taken substantially along the line XII—XII of FIG. 8;

FIG. 13 is a perspective view of one of the dunging area directional receptacles;

FIG. 14 is an enlarged fragmentary plane detail view taken substantially along the line XIV—XIV of FIG. 12;

FIG. 15 is a vertical sectional detail view taken substantially along the line XV—XV of FIG. 14;

FIG. 16 is a fragmental plan view illustrative of access gates for the hog pens;

FIG. 17 is a fragmentary vertical sectional elevational view taken substantially along the line XVII—XVII of FIG. 16;

FIG. 18 is a fragmentary vertical sectional elevational view taken substantially along the line XVIII—XVIII of FIG. 16;

Figure 8:
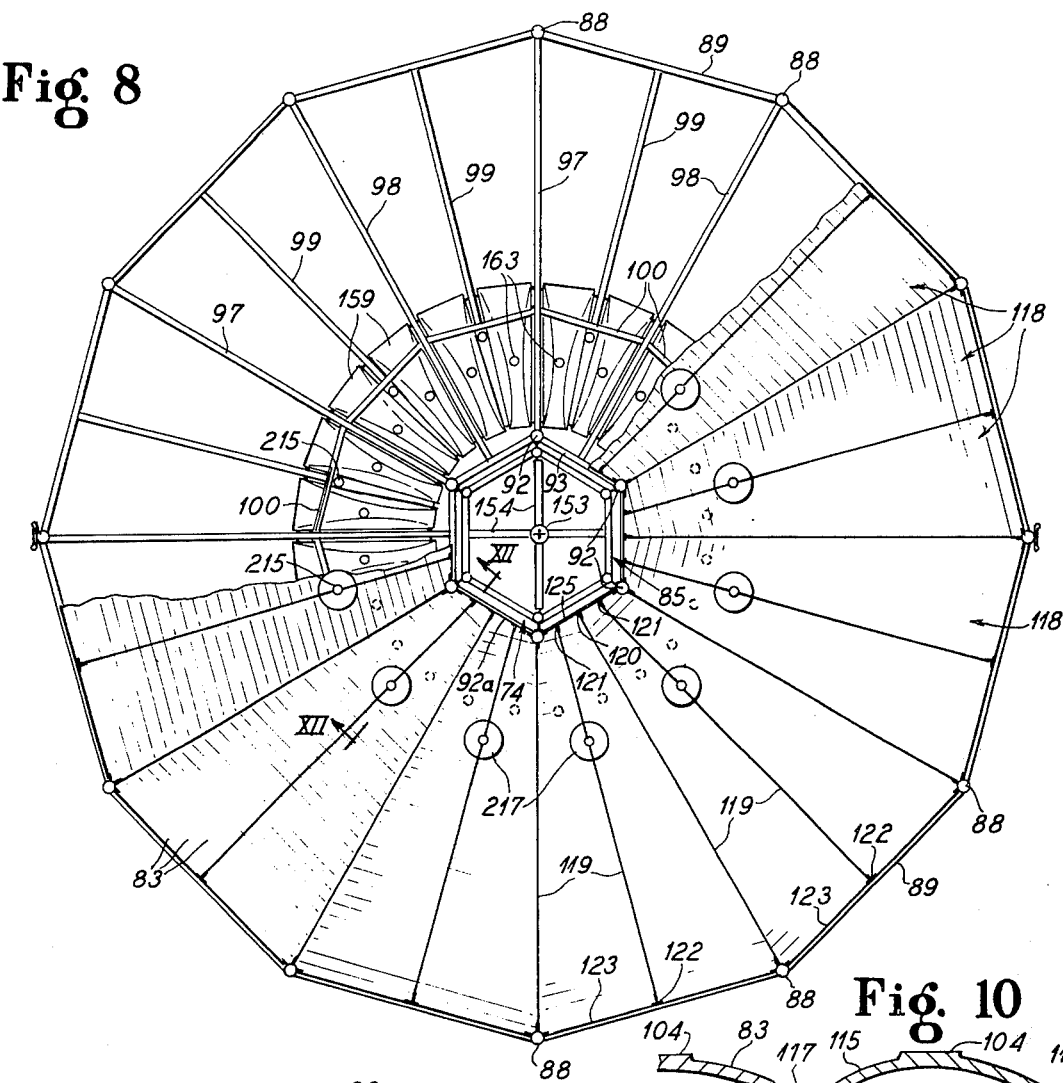
FIG. 8 is an enlarged top plane view of the tiered structure of the system partially broken away for illustrative purposes.

In FIGS. 1 and 2 a representative installation 25 embodying features of the invention is depicted comprising a housing 27 preferably in the form of an air dome, that is, an inflated generally hemispherical membrane type enclosure anchored over a platform-like base 28. Skin material for the housing dome 27 desirably comprises a highly reflective metallic synthetic plastic laminate film which will protect the air space within the housing by shielding against solar energy penetration in hot weather such as during the summer months and by return reflection of animal body radiation maximize animal comfort in cold weather such as during the winter months. For this purpose a reflective aluminized polyvinyl chloride film laminated with a polyvinyl fluoride film may be employed in the housing membrane of skin. For anchoring the air dome housing 27, circumferentially spaced longitudinal ropes or cable 29 radiate from a crown peak ring 30 and a secondary crown ring 31 and are anchored at their lower ends by means of suitable shackles 32 to ground anchors 33 about the periphery of the base 28 which may be in the form of a suitable concrete floor slab. For large capacity, the base diameter of the installation may be in the order of 160 feet and the height of the housing dome 27 suitable to accommodate all desired internal hog production structures. For example, the height of the housing dome 27 may be on the order of ⅓ the base or floor diameter.

Entrance into the installation 25 may be limited to a single entryway through a short corrugated metal tunnel airlock 34 (FIGS. 1 and 4) and a door 35 at ground or base level, the housing dome 27 being otherwise closed against entry.

Improved means are provided for inflating the housing dome 27 and for effecting controlled uniformly distributed air circulation within the enclosure to provide an optimum atmosphere for the hog population. To this end, the inner wall of the housing dome 27 is provided with an annular inwardly projecting duct or ring 37 of suitable volumetric capacity and which may be formed by an inward bulge formed by an annular slack section of the innermost ply of the double-ply housing dome membrane and located at a sufficient height to avoid interference with activities thereunder on the base platform. By having the air distribution duct 37 continuous about the perimeter of the housing dome, a pair of fans located at diametrically opposite sides of the installation outside of the air dome will suffice to provide adequate volume of dome inflating and circulation air during periods of maximum air requirements such as during the summer. To this end one blower type fan 38 (FIGS. 1 and 4-6) may be mounted to drive air through a large volume nozzle 39 into the duct 37 at one location, directional vanes 40 directing the air in both directions in the duct. At an opposite location similar blower fans 41 and 42 communicate with the air duct 37 through similar directional vanes 43 and 44. In a preferred arrangement the fans 38, 41 and 42 are of sufficient capacity to satisfy summertime air volume and cooling requirements. In cold weather, at least, the fans 38 and 41 may be shut down and the fan 42 which may be located adjacent to the fan 41 may be operated in conjunction with a heater 45 to blow suitably tempered air through directional vanes 44 into the air duct 37. Air from the fans keeps the air duct 37 distended throughout its extent, with the air issuing in a uniformly distributed manner through air ports 47 opening from the duct 37 preferably below the central horizontal plane through the air duct so that the air is directed generally downwardly and inwardly as indicated by directional arrows in FIG. 2. To attain proper distribution throughout the entire circumference of the air duct 37, the air distribution ports 47 are of graduated size, being of smallest size in the vicinity of the blower fans and of progressively larger size toward the extents of the air duct 37 remote from the air source fans. The air circulating on through the air space within the enclosure is exhausted under sufficient back pressure conditions to maintain the housing dome 27 thoroughly inflated, the crown of the dome having for this purpose suitable exhaust ports 38 provided with control valve means such as movable panels 49 secured over and about the exhaust ports 48 in any preferred manner and operable for at least a limited extent at the down side of the patch-like valves. Means for controlling the valves 49 may be provided, and since a constant circulation of air is necessary within the enclosure, a steady exhaust air leakage arrangement may be preferred.

By preference the base 28 comprises a flat concrete slab at generally ground level but desirably slightly elevated above the surrounding terrain sufficiently for effective drainage away from the perimeter of the base and housing. At its outer perimeter, the base slab should be of ample diameter to underlie the lower end of the perimeter of the housing dome 27 so that an inturned lower end flange 50 of the housing membrane can engage in substantially sealing engagement with the base slab, as best seen in FIG. 3, under the internal air pressure within the housing. Although the flange 50 may be secured to the base slab, that may not be necessary. To avoid heat loss through the slab of the base 28, a suitable insulating layer 51 may be provided along the underside of the slab. In order to avoid heat loss through the perimeter of the slab, a thermal break 52 may be provided in the form of an annular gap adjacent to and parallel with the outer perimeter of the base slab and desirably having an elastomeric insulating seal 53 therein.

On and above the base 28 and in the air space afforded by the housing dome 27 are provided all of the features of the system for hog production from breeding to market weight. Among these features is the provision of preliminary production facilities in a substantial width annular floor area on the base 28 between the housing perimeter and a tiered central final production facility structure 54 rising to a substantial height above the base. An advantageous and efficient spacing saving geometrical arrangement of the preliminary production annular floor area is provided for breeding, farrowing and nursery attention purposes, being divided into a first zone 55 adjacent to the housing perimeter and having breeding pens 57 in an annular series inside of an annular series of farrowing and nursing pens 58 having therein farrowing crates 59. From farrowing to the end of the nursing or suckling period, the new piglets remain in the farrowing and nursing pens 58. An annular access aisle 60 is provided entirely about the pens 58 and from which radially extending connecting aisles 61 lead at suitable circumferentially spaced intervals, such as four to an annular access aisle 62 between the breeding pens 57 and a second annular zone 63 which is divided into a series of nursery feeder pens 64. Orientation of the breeding pens 57 in alignment with the farrowing and nursing pens 58 minimizes the distance sows are required to move from the breeding pens to the farrowing crates 59. Gates 65 in the fences separating the breeding pens 57 adjacent to the farrowing pens 58 may be opened as desired to provide temporary access aisle in this part of the floor area, particularly for access into the pens 57. The arrangement of the gates 65 is such that when they are opened to effect the temporary aisle they will close off the respective breeding pens and permit minimum movement of breeding herd within the first zone 55. This arrangement increases overall floor space utilization and building efficiency. By the advantageous arrangement of aisles ready observation and feeding access to the breeding and farrowing-suckling pens 58 is provided for. It is in the first, outer zone 55 that the bulk of management time is necessary for feeding, breeding and health monitoring reasons. The aisle 62 in addition facilitates observation of the pigs being weaned in the pens 64 as well as for supplying feed to feed troughs 69, there being one such feed trough for each two adjacent pens 64.

After the first thirty days with the sows in the pens 58, the piglets are transferred to the weaning pens 64 where they remain up to the age of about seventy-five days, feeding at the weekly hand-filled troughs 69. Then the growing pigs, still requiring some observation but minimal attention, are transferred to an innermost third annular zone 70 adjoining the innermost ends of the pens 64 which are provided with respective gates 71 for the purpose of moving the pigs into the outer ends of training pens 72. At their inner ends the pens 72 are located on a central aisle 73 about an elevator shaft 74 within the tiered structure 54 and at the center of the housing 27. Gates 75 at the inner ends of the pens 72 enable transfer of the pigs from these pens to the aisle 73. A single radial, temporary, hog transfer aisle 77 is adapted to be formed by temporary fencing through the zones 63 and 70 to effect communication when necessary between the innermost annular aisle 73 and the intermediate annular aisle 62. The temporary aisle 77 is desirably aligned with one of the radial aisles 61 which, in turn, communicates with the outer annular aisle 60 and is aligned with the entrance-exit doorway normally closed by the airlock doors 35.

Placing the sows at the outer periphery of the floor base deck 28 permits environmental modification for enhancing contentment of the sows and thus attainment of a higher number of pigs per litter and a lower loss of newborn pigs. To this end, the lower end portion of the dome housing 27 is provided below the air distribution ring duct 37 with transparent window panel areas 78, (FIGS. 2 and 3) entirely about the breeding and farrowing zone 55. This minimizes confinement stress by providing the sows an extended vista. The transparent areas 78 are advantageously located in generally inwardly extending lower portion of the housing done 27 below the maximum annular bulge of the housing, whereby the transparent window areas 78 are protected from the hottest overhead sun. If more sun shading is desired, awning or sun shield means 79 (FIG. 4) may optionally be provided on the sunny or front side of the housing. Such sun shield 79 may comprise a bulge from or an extension or a substitute for the inwardly bulging air distribution ring duct 37. Desirably a substantial rear area 78a (FIG. 1) of the housing dome 27 is highly translucent or transparent to provide natural daylight illumination of the interior of the housing.

Means are provided below the level of the base floor deck 28 for waste disposal. To this end, an annular waste collecting trough 80 (FIG. 2) is provided under the adjacent end portions of the breeding pens 57 and the farrowing-suckling pens 58, the trough being covered by spaced floor slats 81 (FIGS. 2 and 4). Thereby the piglets are trained to defecate and urinate at the inner ends of the pens 58. Any preferred clean-out or steady state oxygenation-reduction method may be employed in respect to the trough 80.

Below base or ground floor level in a substantial central area and preferably under substantially the major area under the tiered structure 54, there is provided a waste collecting sump basin 82 which is covered over by means of apertured flooring desirably in the form of spaced floor slats 83 having their upper surfaces generally level with the top plane of the base or deck slab 28 and supported on suitable floor beams or girders 84 spanning the basin 82. In a preferred form, the basin 82 is of generally concave shape sloping toward greatest depth at the center of the installation. The arrangement is such that although the major wider sections of the weaning pens 64 have the concrete base slab 28 as floor, the inner end portions of the pens 64 are over the waste collecting basin 82 and are provided with the spaced slats 83, thereby providing apertured dunging areas at the inner ends of these pens. The generally wedge shape design of the pens 64, so that they are widest toward the outer ends near the aisle 62, and narrowest at their inner ends over the slat 83, encourages the pigs to use the narrowest inner ends of the pens for dunging purposes, leaving the widest ends of the pens for social uses of the pen group. By the time the pigs reach the weaning pens 64, they are preferably collected into three-litter groupings and remain together until sent to market. Experience has shown this to be the most comfortable social unit for confinement raising of the animals, although larger groupings are also possible.

Up to this point, the description has concerned itself with handling and transfer of the animals through three successive stages of growth and development, from the most intensive demands upon management time and need for close observation in the breeding pens 57 and the farrowing crate pens 58 in the first zone 55, then movement of the animals successively to the nursery pens 64 in the second zone 63 where diminished attention and observation is required, and lastly to the training pens 72 in the third, final preparation zone 70 where the animals are automatically fed under minimum observation preparatory to transfer at about ninety-six to ninety-nine days of age to the upper levels in the tiered structure 54. As the animals are progressively moved in the three preparation stages, the pen sizes are adapted to the age and developing size of the animals, thereby utilizing the space on the base floor to best advantage. In addition, the pigs are progressively and with minimum stress moved from the first zone 55 of minimum animal density to the second zone 63 of medium animal density and where the pens 64 are only partially under the tiered structure 54, and then to the final preparation, third zone 70 which is entirely within the confines of the tiered structure 54 where the greatest animal density prevails within the hog production installation. In the pens 72 final training of the pigs occurs before transfer to the upper hog finishing decks of the tiered structure 54. Not only are the pens 72 of generally wedge shape and larger to accommodate the larger size of the pigs at this stage, but the entire floor area of the pens 72 is apertured by means of the spaced slats 83. Feeding is provided for automatically at the narrowest innermost end dunging areas of these pens whereby to encourage and promote normal use of these areas by the animals for dunging and urination. The aisle 73 along the inner ends of the pens 72 and about the elevator shaft 74 provides area for general observation of the pigs residing in the pens 72 and provides area for sick animal observation and storage.

When the pigs are old enough to be transferred from the pens 72, they are moved through the inner end gates 75 across the aisle 73 into an elevator 85 in the central elevator shaft 74 and by which the pigs are transferred to one of a plurality of upper floors or tier decks 87 in the tiered structure 54. This tiered structure 54 comprises primarily an open framework supporting the decks 87 at suitable elevations above the base 28 and above one another and provides the elevator shaft 74. In a preferred construction, the frame of the tiered structure 54 comprises an outer perimeter series of circumferentially spaced vertical posts 88 (FIGS. 2, 8, 9 and 11) supporting horizontal beams 89 therebetween and connected thereto as by means of bolts 90 securing the ends of the beams to respective weld plates 91 integral with the supporting posts 88 at the several tier levels in the structure. In the example illustrated there are twelve of the posts 88, and at each tier level 12 of the outer perimeter beams 89. At the central portion of the structure 54, a circumferentially equally spaced series of vertical frame posts 92, such as six in number, are located about the elevator shaft 74. At the first floor level and at each tier level the posts 92 have horizontal supporting beams 93 extending therebetween and secured thereto as by means of bolts 94 attaching the ends of the beams to weld plates 95 integral with the posts. At each tier deck level every second one of the outer posts 88 has secured thereto an outer end of a generally radially extending horizontal floor girder 97 which has its inner end secured to one of the central posts 92. Additional floor girders at each tier comprise generally radially extending girders 98 secured at their outer ends to every alternate one of the outer posts 88 and at their inner ends to the center of the beams 93 which are connected to and between the posts 92. In addition, generally radial girders 99 equally spaced between the girders 97 and 98 are secured at their outer ends to the longitudinal center of the outer perimeter beams 89 in each instance. At their inner ends the girders 99 are secured to the sides of transverse girders 100 spaced a limited distance from the posts 92 and having their opposite ends secured to respectively the girders 97 and 98. At ground or base level the outer posts 88 are mounted on and suitably anchored to sunk concrete piers 101 (FIG. 11) adequate to support the load. Support for the lower ends of the posts 92 is provided by a foundation slab 102 (FIG. 2) in the center bottom of the waste receiving basin 82. Arrangement of the floor beams or girders 84 is preferably substantially the same as the grid work of girders in the tier decks 87, inner ends of the base floor girders being secured either to the posts 92 or to the lowermost of the transverse beams 93, but since the lower ends of the outer posts 88 may be at a higher elevation as seen in FIG. 11, means are provided in the form of a concrete supporting ledge 103 for supporting the outer ends of the girders 84 adjacent to the rim of the basin 82. In other respects the base floor girder grid may correspond substantially to the floor girder grid pattern of the tier decks 87 as shown in FIG. 8.

Not only does the floor girder grid provided by the base floor girders 84 support the floor deck slats 83, but each of the tier decks 87 is provided with a covering of the slats 83 supported by the girder grid at each such tier deck. In a preferred construction, each of the slats 83 comprises an elongated aluminum extrusion having a slightly upwardly arched form to promote drainage with the top of the arch provided with a wear rib 104. Along each side, each of the slats 83 is provided with a longitudinally extending vertical supporting leg flange 105, each of which is provided with an inturned reinforcing and foot flange 107 for engagement on top of the respective supporting girders. In the assembly, the foot flanges 107 of the slats 83 are supported on the radially extending floor girders, being of graduated lengths corresponding to the convergence of the radially extending girders so that the ends of the slats will rest on certain of the girders and the slats will be intermediately supported by intermediate girders. Referring to FIG. 8, at their ends the slats are conveniently engaged upon the radial girders 97 and 98, with the intermediate radial girders 99 providing intermediate support for the slats except at the central area of the tier deck in each instance where the slats 83 are the shortest and thus need no intermediate support.

For connecting the slats 83 against displacement relative to one another and for maintaining the slats in substantially uniformly spaced relation, connectors 108 are provided which are preferably formed as aluminum pieces of minimum thickness compatible with desirable structural rigidity for the intended purpose and provided with opposite spacing edge portions 109 conformable to the slightly toed in disposition of the slat legs 105 to promote drainage (FIGS. 11 and 18). At their upper edges, the connector-spacers 108 are preferably of concave form and have oppositely extending generally upwardly curved connector arms 110 which are engaged interlockingly in complementary interlock socket grooves 111 formed at juncture of the supporting legs 105 with the body portions of the slats. This facilitates separable assembly of the spacer-connectors 108 with the slats. In the dunging areas of the pens, spacer-connectors 108' (FIG. 15) are desirably provided which are substantially the same as the spacer-connectors 108, but have upstanding central rounded head obstacle projections 112 to discourage use of the dunging area for resting by the penned animals. Other of the spacer-connectors 108" (FIGS. 11 and 17) are provided with downward leg extensions 113 engageable in stabilizing relation with the sides of at least the upper supporting flanges of the girders on which the slats 83 rest, thereby providing means to maintain the girder beams against lateral displacement. To prevent electrolysis at the points of contact with the girders which may be steel while the spacers 108" are aluminum, the members 108" may be coated with a suitable protective, insulating plastic or other protective material. For the same purpose, an insulating protective layer 114 of insulating plastic or other suitable material may be applied between the foot flange 107 of the slats 83 and the tops of the girders. In addition to its anti-electrolysis value, the layer 114 may have cushioning or sound dampening value to minimize sound transfer between the slats 83 and the supporting girders.

Figure 10:
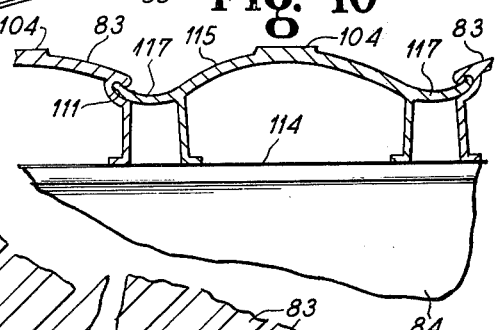
FIG. 10 is a fragmental vertical sectional elevational view showing one form of deck slat structure.
Figure 9:
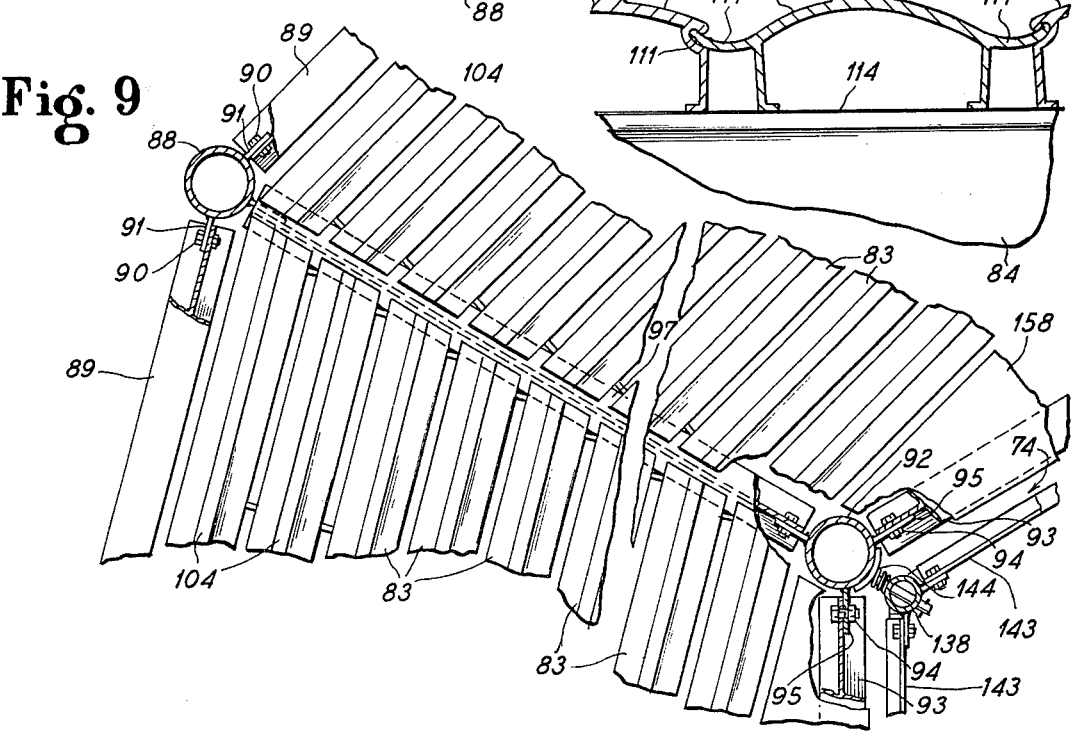
FIG. 9 is a fragmentary enlarged sectional plane view showing details of one of the tier decks and supporting structure.

For optional use in the social areas of the various pens certain of slats 115 may be constructed as shown in FIG. 10 with integral spacer-connector means 117 in the form of lateral upcurved opposite side flanges to interlock in the socket grooves 111 of the contiguous slats 83 along the opposite sides. In other respects the slats 115 may be the same as the slats 83. Where desired the slats 115 may alternate with the slats 83; or different arrangements may be effected, such as every fifth slat being replaced by one of the slats 115, and the like. Use of the slats 115 in the social areas of the pens will hold puddles in the trough-like connectors 117 and thereby discourage urination except in the dunging areas of the pens.

Each of the tier decks 87 is subdivided into a series of contiguous generally wedge-shaped hog finishing pens 118 (FIG. 8) extending generally radially throughout the radius of the tier deck between the outer perimeter and the elevator shaft 74, with the major extent widest outer area of each pen providing roomy social section for each pen group of hogs. The narrower inner end portion of each pen provides the dunging and feeding area. Each of the pens 118 is divided from each contiguous pen by means of a fence or partition panel 119 which may be solid throughout most of its extent. Certain of the divider fence panels 119 are secured at their respective opposite ends to the frame posts 88 and 92. Others of the divider panels are connected at their outer ends to certain of the frame posts 88 and at their inner ends to stanchions 120 rising from bars 92a which are attached to the posts 92. The remainder of the radial divider fence panels 119 are connected at their inner ends to stanchions 121 rising from the connecting bars 92a and at their outer ends are connected to respective stanchions 122 rising from the outer perimeter beams 89 and also attached to intermediate portions of outer end enclosure vertical circumferentially extending thin wall fence panels 123 which have their opposite ends secured to the frame posts 88. Desirably the fence panels 119 and 123 are view blocking, e.g. solid opaque, except that the panels 119 are provided with limited size sighting areas, e.g. openings 124 at the dunging areas to permit through-the-fence visiting between contiguous hog groups and which has been found to be a desirable feature to promote consistent use of the dunging areas.

At their inner ends, the pens 118 are closed by means of respective gates 125 which are adapted to be opened for transfer of pigs into the pens and removal of finished hogs from the pens over sills 127 mounted on the tops of the cross beams 93 and spanning and resting on the contiguous end portions of the girders 97 and 98. Each of the gates 125 may be substantially the same as the gates 75 for the inner ends of the pens 72 therebelow which are divided from one another by side partition fence panels 128, and also similar to the gates 71 which close the inner ends of the pens 64 (FIGS. 16–18) which are divided from one another by means of radial partition fence panels 129. By having the gate ends of the several pens 64, 72 and 118 of substantially the same width, a standardized gate construction may be employed. Therefore description of the gates 71 and the manner in which they are hung will suffice for description of the gates 75 and 125. Mounting of the gates 125 may be effected on the posts 92, and on the stanchions 120 and 121, as available. For the gates 71 and 75, support may be provided in part by means of stanchions 130 mounted on the girders 84 and which also provide support for aligned partition fence panels such as the panels 128 and 129, the intermediate fence partition panels 129 being supported by suitable stanchions 131 carried by transverse supporting bars 132 secured at their opposite ends to the stanchions 130. Each of the gates 71 may comprise a panel member provided with opposite vertical angular reinforcing flanges 133 equipped with vertically spaced hinge eyes 134 at each side of the gates arranged to align with a corresponding hinge eye 135 carried by the bar 132 at the bottom of the gate and receptive of a connecting pen 137. A similar arrangement may be provided at the top of the gate. Thereby, lifting the pins 137 at either side of the gate permits swinging of the gate as on a hinge about the axes of the connecting pins at the opposite side of the gate. On the other hand, if desired the gates can be lifted away and set aside.

Transfer of pigs from the first floor pens 72 to selected upper floor pens 118, and removal of finished hogs from the upper pens 118 is effected by means of the elevator 85. In a simple and efficient construction, the elevator 85 comprises a frame in which vertical posts 138 equal in number to and parallel to the posts 92, but of only about one story height, are secured rigidly in properly spaced relation by means of horizontal connecting beams 139 at their upper ends and by means of horizontal beams 140 at their lower ends. Suitable lengths of the slat bars 83 are supported as a floor for the elevator on girders 142 secured to and between the lower end portions of the vertical elevator beams 138 and with the tops of the elevator floor slats 83 in a plane with the tops of the lower frame beams 140. Suitable gates 143 are provided at the six sides of the elevator to facilitate loading and unloading from any side. For guiding the elevator 85 in the elevator 85 in the elevator shaft 74, slide shoes of arcuate shape to engage with the inner faces of the cylindrical posts 92 are mounted on the vertical elevator frame posts 138 adjacent their upper and lower ends by means of stems 145 projecting from the shoes and extending slidably through horizontal bearing bores in the elevator frame posts 138. At their inner end portions, the stems 145 may carry means such as cotter pins 148. To assure traction of the shoes 144 with the posts 92, biasing means such as coiled compression springs 149 may be mounted about the stems 145 between the shoes 144 and the respective frame posts 138.

Operation of the elevator 85 is effected by means of a suspension including a hoisting cable 150 depending from a hoisting winch mounted on a head frame 152 at the top of the elevator shaft provided by upward extension of the posts 92 above the upper floor deck 87. At its lower end the hoisting cable 150 is attached by means of a suitable coupling 153 to a head beam structure 154 on the top of the elevator 85. Means are desirably provided in association with the elevator suspension to enable weighing the hog loads carried by the elevator 85. For this purpose, load sensing means such as a load cell 155 may be coupled with the elevator suspension as by being mounted in the coupling 153 in such a manner as to be responsive to elevator carried hog loads. Such a load cell and the manner in which it may be connected with a suitable readout scale or the like may be effected according to known technology. Powered operation of the elevator by means of the winch 151 may be effected in any well known or preferred manner.

Cables 156 (FIG. 2) are connected between the upper ends of the posts 88 and the upper ends of the posts 92 to protect animals and structure should the housing dome collapse due to failure of the inflating system.

In transferring pigs from the first floor pens 72 to the elevator 85, the selected pen gate or gates 75 are opened and an adjacent one of a set of guard rail gates 157 mounted between the posts 92 is opened, as well as the aligned elevator gate 143 with the floor of the elevator disposed in a plane with a first floor sill 158. The pigs are driven into the elevator, the elevator gate 143 closed, and the elevator hoisted to the selected tier floor level where the elevator gate 143 nearest the tier level gate 125 is open, the tier level gate 125 to the selected pen 118 opened and the pigs driven into the pen 118 which is then closed. Conversely, finished hogs may be transferred in reverse manner from the selected pen or pens 118 and the elevator lowered until the elevator floor is aligned with the sill 157 whereupon the elevator gate in alignment with temporary aisle extension 77 is opened and the hogs driven out of the building through the temporary aisle 77 and the aligned aisle 61 to and through the axit 34.

Waste from the dunging areas of the upper floor pens 118 and from the first floor pens 64 and 72 is collected in the basin 82 for conversion and recycling into the food stream. To this end, the dunging areas for the first floor pens 64 and 72 are in direct communication with the basin 82 through the spaced slats 83. Waste from the upper deck pens 118 is successively funneled down from each deck to the deck below, until collected in the basin 82. By means of waste-receiving and directing receptacle funnel devices 159 suspended under the dunging areas. Conveniently the devices 159 may comprise suitable plastic film shrink fitted on a generally figure-8 frame in which a pair of longitudinal heavy wire frame bars 160 of generally V form are disposed in dual crossing relation as shown in FIG. 13 with the bar ends at one end of the device substantially more widely spaced than the bar ends at the opposite end of the device. A cross bar 161 is secured to and between the widely spaced bar ends and a shorter cross bar 162 is secured to and between the more narrowly spaced ends. The receptacle film body of the device 159 is provided at the low point with a discharge opening 163. As best seen in FIGS. 8 and 12, the length and width of the top opening for the device are proportioned to permit the device to fit in fairly complete waste receiving manner under the dunging area of the respective pen 118 with which associated, such area extending from outwardly adjacent to the cross joists 100 to the inner ends of the pens 118. In order to permit the upper edges of the collecting devices 159 to be located closely under the floor deck provided by the slats 83, reinforced upwardly opening clearance notches 164 are provided in the side walls of the film body of each of the devices 159 to receive the cross bar 100. Suitable hangers 165 are provided on the rafter framework to receive hanger terminal end portions of the end bars 161 and 162. All of the collecting and funneling devices 159 are located in alignment one above the other so that the discharge holes 163 are aligned as shown in FIG. 12 for dropping of the waste collected in each of the devices 159 and funneled toward the openings downwardly and then through the slats 83 in the first floor level closely adjacent to the inner ends of the pens 72, dropping down into the basin 82.

In a preferred arrangement the waste collecting basin 82 is provided with a leakproof liner which may comprise a heavy plastic film 167 (FIGS. 2 and 11) which may, if preferred, be laid directly on the ground in an excavation suitably shaped to provide the desired concave basin contour. If ground conditions demand it, of course, a stabilizing concrete or other liner 168 may be applied to the basin excavation either as a support for the plastic liner 168, or to serve directly as the basin surface. It may be observed that the collecting basin 82 is of ample capacity to accommodate a large volume of liquid and solid animal waste material 169 for continuous conversion into food supplement for recycling into the feed supply for the hogs from which the waste material has been derived. Conversion of the waste material may be in accordance with the processes disclosed in U.S. Pat. Nos. 3,846,558 and 3,846,559 which are included herein by reference to any extent necessary for a complete understanding of the present invention. It will be understood, however, that any other preferred process or modification may be employed. The principal criterion is to effect complete conversion and recycling of the animal waste materials to the extent possible. Initially a small quantity of a yeast culture may be necessary to accelerate conversion of the waste products 169 to a usable state. After the large volume of material 169 has been processed for a short interval, conversion proceeds virtually automatically so that even though raw waste products are continuously supplied into the basin 82, conversion proceeds at such a rate as to provide a continuous supply of high protein animal feed supplement to be added to freshly supplied hog feed such as ground corn, soybean meal, and the like.

Figure 19:
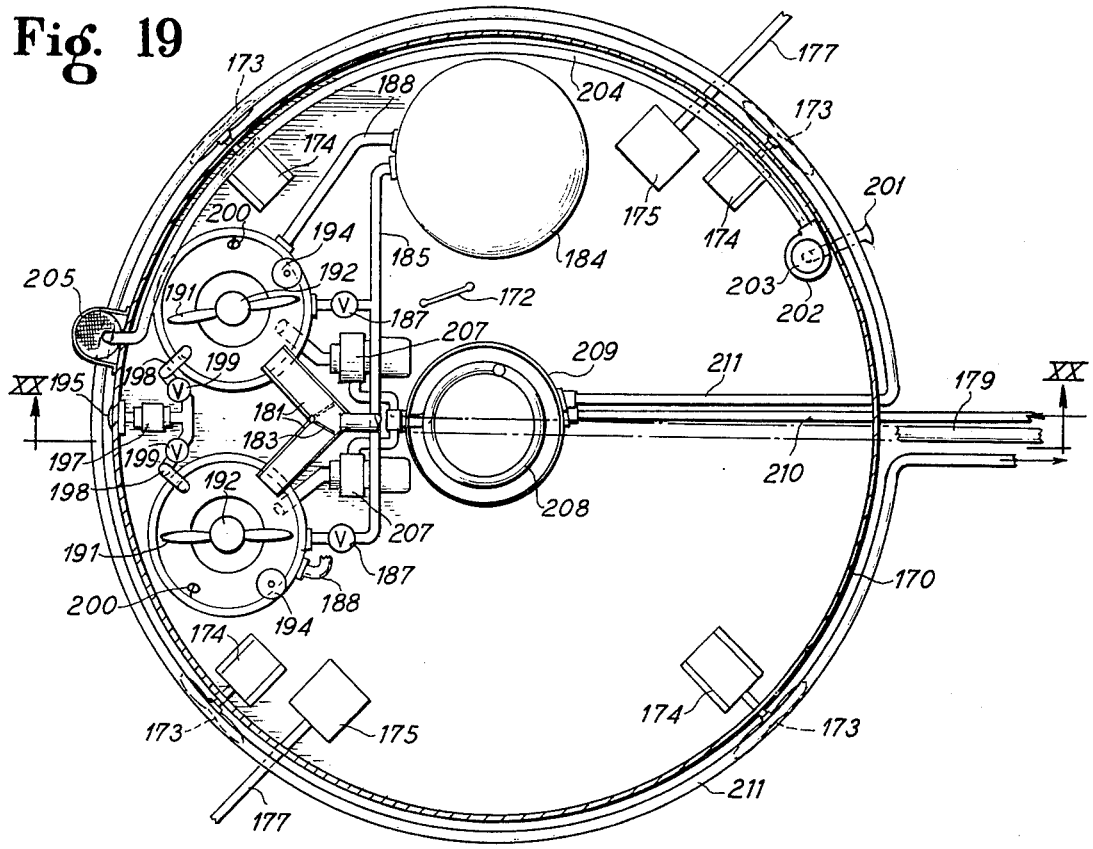
FIG. 19 is an enlarged horizontal sectional plan view of the feed processing area of the system, taken substantially along the line XIX—XIX of FIG. 2.
Figure 20:
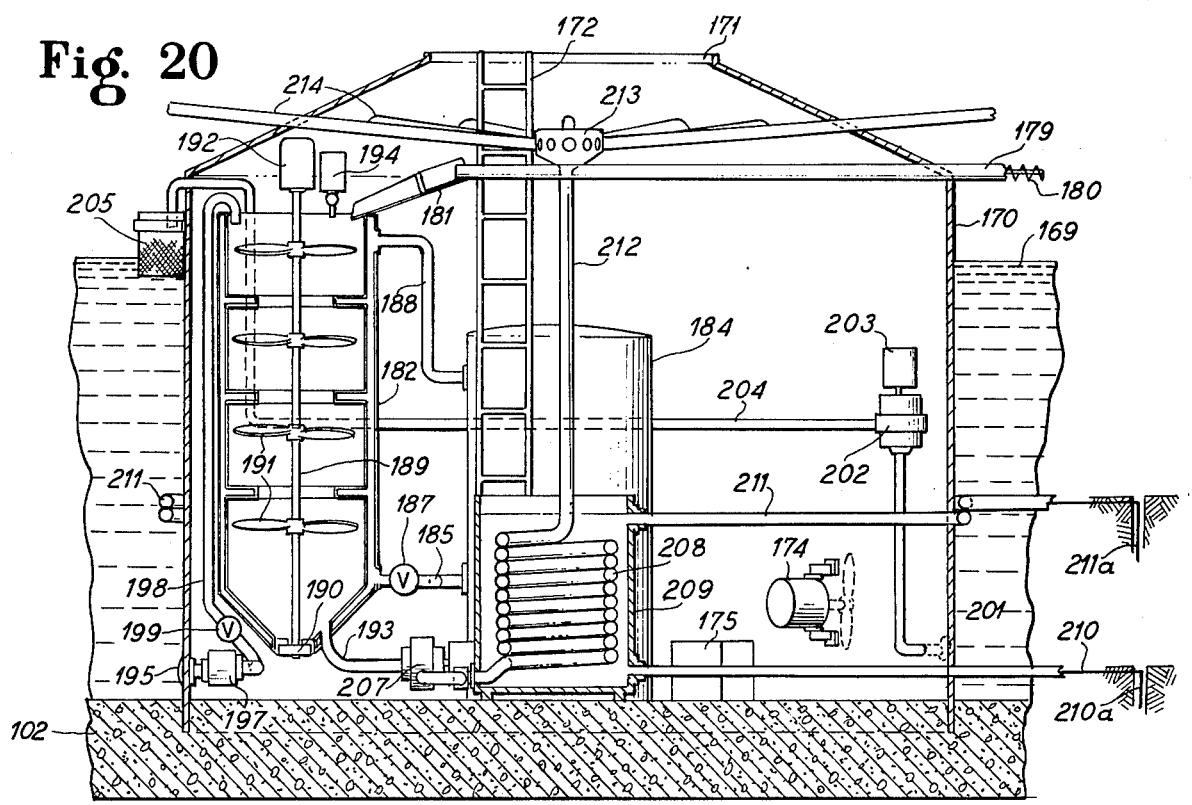
FIG. 20 is a vertical sectional elevational view taken substantially along the line XX—XX of FIG. 19.

Means are provided for substantially automatic, continuous feed preparation and supplying. To this end, a continuous feed processing plant is housed within a large tank-like enclosure 170 (FIGS. 2, 19 and 20) mounted on the foundation slab 102 centrally in the bottom of the basin 82 under the elevator 85 and with the top of the tank 170 in clearance relation below the first floor level. An ample air entry and access manhole 171 in the top of the tank 170 provides for supervisory access to the processing room within the tank 170 as by means of a ladder 172. By having the feed processing facility located centrally of the production installation, not only is waste recycling efficiency improved, but uniform, economical and efficient feed distribution is effected. Since the tank 170 is in the deepest part of the accumulated waste material 169 in the vat provided by the basin 82, effective continuous mixing and aeration of the body of waste material 169 is simplified. Continuous mixing is desirably effected by means of propellers 173 located about the outer perimeter of the tank 170 adjacent the bottom at suitably spaced circumferential positions such as four and driven by motors 174 located inside the tank. Aeration may be effected as depicted by one or more compressors 175, two being shown, located in the tank 170 and supplying aerating air through ducts 177 extending from the tank a suitably distance to supplement air normally available at the large surface expanse on the waste material 169 and provided by the dropping through substantial air space of the waste material from the animals from floor to floor into the collecting basin.

According to the preferred feed preparation process, fresh feed material in the form of mash or mash ingredients is supplied from a suitable source such as a silo 178 (FIG. 1) conveniently located adjacently outside of the housing 27 and conducted through an intake feed line 179 into the feed processing tank 170, suitable means such as an impeller 180 being provided to deliver the feed through the conduit 179 at a desired flow rate. Fresh feed is supplied from the discharge end of the conduit 179 into a chute 181 which has two branches each of which leads into the top of one of a pair of jacketed vertical cylindrical cooker mixer vats 182 which are preferably alternately operable, the chute being provided with a flip flop gate 183 to regulate fresh feed discharge into the selected cooker. Cooking, pasturizing heat is supplied by a suitable fluid medium such as water heated to the proper temperature in a boiler 184 from which the heated boiler liquid is conveyed to the lower end portions of the hollow double walls of the cookers 182, under the control of respective valves 187. Spent heating liquid is returned to the boiler 184 through a return duct 188. In the cookers 182, the feed mixture is continuously agitated by means of an agitator 189 comprising a central vertical shaft supported in a thrust bearing 190 in the bottom of the respective cooker and having a plurality of vertically spaced agitating vane propellers 191 and driven by a motor 192 at its upper end for continuous mixing, agitating and downward driving of the feed mixture which leaves the respective cooker through a bottom takeoff duct 193. Desirably enzyme additive for mixture viscosity control is supplied from a source container 194 located at the top of each of the cookers 182. In preparing the feed mixture a ratio of about 75% fresh feed to about 25% recycled waste material is supplied to each of the cookers 182 during operation. For recycling, the converted waste material is withdrawn from the greatest depth within the basin 82 where conversion to feed protein quality is substantially completed in the mass of material 169. For this purpose, an intake 195 desirably located in the vicinity in the cookers 182 and as close as practicable to the lower end of the tank 170 communicates with a pump 197 by which the converted waste material is pumped through respective branch delivery ducts 198 into the upper ends of the cooker vats, under the control of respective valves 199. Each of the cooker vats is desirably provided in its upper end with a float controlled limit switch 200 to prevent overflow, it being understood that all of the motors and control valves and gates are integrated in an electrical control system having suitable control panel and monitoring devices at a suitable control station, as is customary with integrated operating systems.

As an auxiliary feature, hog bristle removal means are provided comprising an intake 201 suitably coupled to a pump 202 driven by motor 203 and directing the waste material 169 through a duct 204 into a collecting screen container 205 suitably located adjacent to the top of the tank 170 to facilitate clean-out from time to time. The material cycled through this bristle removing system returns into the mass of material 169 from the collecting screen 205.

The pasturized food mixture leaving the cookers 182 through the respective discharge ducts 193 is driven by respective pumps 207 through a cooling coil 208 immersed in a cooling tank 209 through which cooling water is circulated by way of an intake duct 210 leading from a source such as a well 210a and entering the bottom of the tank 209. The cooling water then discharges from the upper portion of the tank 29 through a duct 211 and circulates in one or more circuits around the exterior of the housing tank 170 for transfer of residual heat into the waste material 169 to accelerate bacterial conversion activity. Thence the exhaust duct 211 conveys the spent cooling water to a second well 211a near the supply well and is returned to the earth and thereby cooled to a reusable temperature.

Pasturized, cooled feed mixture leaves the cooling coil 208 through a conduit 212 and through a manifold 213 is distributed to feed supply ducts 214 which deliver into the lower ends of respective stand pipes 215 (FIGS. 2, 4, 8, 12, 14 and 15) extending vertically at the combination feeding and dunging areas of the superposed pens 72 and 118 for delivery of the feed mixture supply into suitable size feed troughs 217 desirably in the form of bowls extending receptively about and supported by the stand pipes 215. By preference one of the stand pipes extends upwardly between each alternate pair of the respective pens so that each of the feed troughs 217 will serve two contiguous pens in each instance. To accommodate the feed trough, the associated pen-dividing partitions 128 are provided with suitable clearance holes 218, and the divider partitions 119 are provided with suitable clearance holes 219. Upward extensions of the feeder clearance holes accommodate the stand pipes 215. Clamps 220 secure the severed sections of the partitions 119 and 128 at the stand pipe 215 in each instance, and means for stabilizing the lower portions of the partitions at the openings 218 and 219 comprise securing the partition parts at opposite sides of the clearance holes to adjacent of the projections 112 as by means of bolts 221 (FIG. 15). Vertical fence posts 119a rising from the underlying girders may also support the divider partitions 119.

In a preferred construction, the feed troughs 217 are constructed from a suitable light-weight durable form retaining synthetic plastic such as a clear acrylic and mounted on the associated feed supply stand pipes 215 for automatic filling. For this purpose each of the feed troughs 217 is vertically reciprocably mounted for movement in a limited range and carries a sleeve valve 222 which surrounds the stand pipe 215 and has a lower end annular flange 223 which is secured fixedly in spaced relation as by means of pins or screws 224 above a hub 225 on the feeder trough 217. The space between the flange 223 and the hub 225 provides an annular feed entry orifice 227 through which the substantially liquified feed from the stand pipe 215 can flow into the bottom of the feed trough bowl from a delivery port 228 in the form of a horizontal slot in the stand pipe 215 of about the same width as the orifice 227. Normally biasing means in the form of a coiled compression spring 229 biases the trough 217 upwardly as shown in dash outline in FIG. 15 to effect registration of the orifice 227 with the port 228 for filling of the trough 217. At its upper end the spring 229 thrusts against the underside of the hub 225. At its lower end, the spring 229 rests on a shoulder fixed on the stand pipe 215, such as may be provided by an attaching clamp 230 secured to an adjacent girder such as one of the girders 100. The load capacity of the spring 229 is chosen to permit substantial filling of the trough 217 to a satisfactory level 231, sufficiently below the rim of the trough 217 to minimize spillage by displacement from the snouts of feeding pigs or hogs. At the maximum fill level 231, the trough 217 is depressed so that the sleeve valve 222 closes the delivery port 228, a pair of suitably spaced sealing O-rings 232 being carried by the lower end inner wall of the sleeve valve 222 and engaging the stand pipe 215 to seal off the orifice 228 in the loaded condition of the trough as visualized in full line in FIG. 15. To prevent leakage around the hub 225, it carries sealing means such as an O-ring 233 in engagement with the stand pipe perimeter. A secondary sealing O-ring 234 is desirably carried by the upper end portion of the sleeve valve 222 in engagement with the perimeter of the stand pipe 215. Through this arrangement, it will be appreciated that each of the numerous feed troughs 217 is maintained automatically supplied with a satisfactory volume of liquified feed, the weight of the full feeder automatically shutting off the supply, and, as the feed is consumed, the feeder trough automatically rising and opening the trough to the associated delivery port 228. Full response to demand at any feeding station is thus maintained constantly.

From the foregoing it will be apparent that a thoroughly selfcontained hog production system is provided which can accommodate a large animal population under continuous production, with minimum management attention. In those areas where maximum management attention is needed, the arrangement is such as to promote utmost efficiency. All steps or stages from breeding through finishing of the hogs is accomplished in a logical and efficient sequence resulting in securing maximum production from the confined hog production system.

It will be understood that variations and modifications may be effected without departing from the spirit and scope of the novel concepts of this invention.

I claim as my invention:

1. Means for hog production in a controlled environment and including a housing rising from and covering a base providing a first floor of substantial expanse, and a multi-tiered structure spaced substantially inwardly from the perimeter of the housing, and comprising:

a plurality of vertically spaced tier floors above said first floor and all of the tier floors being equipped with hog finishing pens large enough to accommodate a social group of growing hogs to finished market size, each finishing pen having a social floor area in one end portion in which the hogs penned therein for finish growing can congregate and rest, and each finishing pen having a slatted feeding and drop-through dunging floor area in an opposite end portion where hog feeding and dunging can take place without disturbing the hogs in the social area, there being automatic hog food supplying means in each feeding and dunging area;

the social areas of the finishing pens of each tier floor being vertically aligned with the same areas in the pens therebelow and the feeding and dunging areas of the finishing pens of each tier floor being vertically aligned with the same areas in the pens therebelow;

means under each of the slatted feeding and dunging areas for collecting dropped hog waste and funneling the waste to drop through such a small portion of the slatted feeding and dunging area therebelow that the hogs can readily avoid said small drop portion while using the feeding and dunging area;

a substantial width area on the first floor between said housing perimeter and said multi-tiered structure being divided into:

an annular array of farrowing pens for farrowing crates adjacent to the housing perimeter;

an annular array of breeding pens surrounded by said farrowing pens and having gates adjacent to the farrowing pens;

an annular array of nursery pens surrounded by and separated from the breeding pens by an annular aisle and adapted for receiving small nursery size pigs from the farrowing pens;

means enabling hand feeding of the nursery pigs from said aisle;

an annular array of training pens surrounded by and having gates separating them from the nursery pens and in which training pens trainer pigs are received from the nursery pens after attaining a stage of development in which they can adjust to automatic feeding means;

at least said training pens being under said tier floors in vertical alignment under said finishing pens and each training pen having a social area and a slatted feeding and drop-through dunging area both of which training pen areas are located in vertical alignment under the corresponding areas of the overhead finishing pens, and there being similar automatic hog food supplying means in the training pen feeding and dunging areas as in the overhead feeding and dunging areas of the finishing pens, the waste collecting means of the finishing pens funneling and dropping the hog waste through the training pen feeding and dunging areas in the same manner as in the like areas of the finishing pens, whereby to accustom the trainer pigs to the conditions in the upper tier floor finishing pens before transfer of the pigs as growing hogs to said finishing pens;

and means centrally located relative to the array of training pens by which the pigs are transferred to the hog finishing pens on said tier floors after a limited growth and training development time interval in said training pens.

2. Means according to claim 1, wherein, said training pens have other gates for removal of pigs therefrom for transfer to the finishing pens.

3. Means according to claim 1, wherein said nursery pens are smaller than said training pens, and the finishing pens are substantially larger than said training pens.

4. Means according to claim 1, including means wholly contained under said tiered structure for conversion and recycling waste from the pigs in the nursery and training pens and from the finishing pens into feed supply for the training pens and the finishing pens.

5. Means according to claim 1, wherein said housing comprises an air dome having front and side and top areas normally exposed to the sun and provided with solar shield and heat reflection means whereby to protect the air space within the housing against solar energy penetration during hot outside weather and to effect return reflection of animal body heat radiation to maximize animal comfort during cold weather, a lower perimeter portion of the dome about the farrowing area being transparent.

6. Means according to claim 1, including in each instance, means below said waste directing means for receiving of waste from the training pens, and substantially view-blocking fences separating said finishing pens, said fences having limited hog-visiting sighting areas at the dunging areas whereby to promote use of said dunging areas by the hogs.

7. Means according to claim 1, wherein said housing has a circumferential air duct adjacent to the first floor, means for supplying air under pressure into said duct, and discharge ports opening from said duct generally radially toward the interior center of the housing at spaced intervals along the duct.

8. Means according to claim 1, wherein said tiered structure comprises a frame including vertical posts about an elevator shaft, a hog carrying elevator in said shaft, means for guiding the sides of the elevator along said posts, a suspension including means for actuating the elevator in said shaft, and means coupled with said suspension for sensing the load weight of hogs carried by the elevator.

9. Means according to claim 1, wherein said waste directing means comprise sheet plastic film receptacles and frames maintaining the receptacles distended, each of said receptacles having a discharge port at its lowest point.

10. Means according to claim 1, wherein said finishing pens are separated by substantially view-blocking fences, said fences having limited hog-visiting sighting areas at the dunging areas whereby to encourage use of said dunging areas by the animals.

11. Means according to claim 1, including means for continuously and automatically supplying said food supplying means with hog feed on demand by the hogs.

12. Means according to claim 11, wherein said supplying means comprise vertically extending stand pipes, feed troughs mounted about said stand pipes for vertical movement, said stand pipes having supply orifices communicating with said troughs, and shut off valve means carried by the troughs for controlling feed supply through said orifices into the troughs.

13. Means according to claim 12, including means for normally biasing said troughs into valve opening position, the weight of feed in the troughs loading the troughs in opposition to the biasing means for moving the troughs into closing position of the valve means relative to the ports.

14. Means for animal production in a controlled environment according to claim 1, including an inflatable housing membrane-type air dome, the air dome comprising:

an annular air duct on the air dome adjacent to the floor; means for supplying said duct with air under pressure; and circumferentially spaced air discharge ports in said duct directed into the housing.

15. Means according to claim 14, wherein said air dome comprises a plurality of plastic laminations, one of said laminations having a bulge defining said air duct.

16. Means according to claim 14, wherein said means for supplying air comprises an air pump delivering into said duct at one point, and said ports are directed generally radially inwardly.

17. Means according to claim 14, including means for controlling the temperature of the air supplied by said supplying means.

18. Means according to claim 14, wherein said air dome has a circumferentially extending transparent area below said duct and above said floor.

19. Means according to claim 1, including an annular service aisle around the farrowing pens, means for providing a temporary annular aisle for minimum movement of breeding herd between said breeding pens and said farrowing pens, and circumferentially spaced radial connecting aisles between said annular aisles.

20. Means according to claim 19, wherein said tiered structure has a central elevator shaft within which an elevator is operable for transferring the pigs from the training pens to the finishing pens and for transferring finished hogs from the finishing pens, an aisle between said training pens and said elevator shaft, means for opening a hog transfer aisle through said training and nursing pens from said aisle between the elevator and the training pens to communicate with one of said connecting aisles, and an exit from said housing communicating with said one connecting aisle for removal of the finished hogs.

21. Means according to claim 1, wherein the slatted floor areas comprise supporting girders, spaced flooring slats carried by said girders and defining waste escape gaps therebetween, spacers located in said gaps at spaced intervals along adjacent spaced sides of the slats, means on the spacers and the slats interlocking the spacers with the slats, and downward projections on at least certain of the spacers engaging in stabilizing relation with sides of the girders.

22. Means for hog production in a controlled environment, according to claim 1, wherein said social areas in all of the pens have flooring comprising spaced slats, means maintaining the slats in position, and upwardly opening trough means between some of the slats in the social areas of the pens to hold puddles and thereby discourage urination by the animals except in the dunging areas of the pens.

23. Means according to claim 22, wherein said trough means comprise slat-interconnecting spacers.

24. A system for hog production in a controlled environment wherein facilities for large volume hog production are contained within a housing including animal pens from which animal waste drops downwardly, comprising:
   a receiving basin under said pens and of ample capacity to accommodate all waste produced by a large number of animals for conversion into reusable animal feed for recycling into food supply for the animals;
   a tank within said basin substantially immersed in the deepest part of the waste and having means for separating hog bristles from the waste material in the basin;
   means for agitating and warming the waste material in the basin outside the tank to promote conversion;
   means for supplying fresh feed to said tank;
   means within the tank for combining the fresh feed and converted waste material derived from the basin into a feed mixture and for cooking and pasturizing the mixture;
   means within the tank for cooling the cooked mixture; and
   means for delivering the cooled feed mixture from the cooking and pasturizing means in the tank to said pens.

25. Means according to claim 24, including means housed in the tank for supplying aerating air to said waste material.

26. Means according to claim 24, wherein said cooling means comprises a cooling water receptacle within said tank, means for supplying cooling water to said receptacle, and a duct leading spent cooling water from said receptacle and including a coiled section of the duct encircling said tank and providing said waste warming means whereby to utilize heat derived from cooling of the feed mixture for warming the waste material.

27. Means according to claim 26, including a supply well from which cooling water is derived for said supply means, and a separate return well into which said duct returns the water after it has warmed said waste material.

28. Means according to claim 24, wherein said means for cooking and pasturizing comprise a pair of cookers within said tank, and means for alternately supplying said cookers with fresh feed from said feed supply or converted waste material and cooking heat.

29. Means according to claim 24, wherein said means for delivering feed to the pens comprise stand pipes having delivery ports at the pens, feed troughs vertically movably mounted about the stand pipes at said ports and receptive of feed from the ports, valve means operated automatically by vertical movements of the troughs for controlling the reception of feed from the stand pipes in the feed troughs, and means for automatically controlling the vertical positions of the troughs on the stand pipes in accordance with the feed load conditions in the troughs.

30. Means for hog production in a controlled environment wherein the facilities for large volume hog production are contained within a housing including animal pens from which animal waste drops downwardly, comprising:
   a receiving basin under said pens and of ample capacity to accommodate all waste produced by a large number of animals for conversion into reusable animal feed for recycling into food supply for the animals;
   a tank within said basin;
   means for agitating and warming the waste material in the basin to promote conversion;
   means for supplying fresh feed to said tank;
   means within the tank for combining the fresh feed and converted waste material derived from the basin into a feed mixture and for cooking and pasturizing the mixture;
   means for cooling the cooked mixture comprising a cooling water receptacle within said tank;
   means for delivering the cooled feed mixture to said pens;
   means for supplying cooling water to said receptacle;
   and a duct leading spent cooling water from said receptacle and including a coiled section of the duct encircling said tank and providing said waste warming means whereby to utilize heat derived from cooling of the feed mixture for warming the waste material.

31. Means according to claim 30, including a supply well from which cooling water is derived for said supply means, and a separate return well into which said duct returns the water after it has warmed said waste material.

32. Means for hog production in a controlled environment, including a tiered hog raising structure rising in an air space enclosed within a housing in the form of an inflated plastic film dome, and having a breeding and farrowing area about the tiered structure adjacent to the perimeter of the dome, and comprising:
   front and side and top areas of the dome, which are normally exposed to the sun, being in the form of a highly reflective metallized opaque solar shield and heat retention means whereby to protect the air space within the housing against solar energy penetration during hot weather and against heat loss from within the air space during cold weather by reflection of animal body radiation back to the animals;

a lower perimeter portion of the dome about the breeding and farrowing area being transparent; and a substantial back area of the dome being at least translucent to provide daylight within the housing.

33. Means according to claim 32, wherein said dome has an annular peripherally extending air duct above said transparent lower perimeter portion, means for supplying the air duct with air, and circumferentially spaced ports in said air duct opening inwardly into the housing to ventilate said air space.

34. Means according to claim 33, wherein said air duct provides at least in part a sun shield over said transparent lower perimeter portion of the dome.

* * * * *